(12) United States Patent
Henderson et al.

(10) Patent No.: US 12,527,523 B2
(45) Date of Patent: Jan. 20, 2026

(54) SENSING GUIDEWIRE WITH INTEGRATED PROXIMAL LOCKING FEATURE

(71) Applicant: PHILIPS IMAGE GUIDED THERAPY CORPORATION, San Diego, CA (US)

(72) Inventors: Eric Henderson, Escondido, CA (US); David Burkett, Panama City Beach, FL (US)

(73) Assignee: PHILIPS IMAGE GUIDED THERAPY CORPORATION, San Diego, CA (US)

( * ) Notice: Subject to any disclaimer, the term of this patent is extended or adjusted under 35 U.S.C. 154(b) by 161 days.

(21) Appl. No.: 17/965,596

(22) Filed: Oct. 13, 2022

(65) Prior Publication Data

US 2023/0042834 A1 Feb. 9, 2023

Related U.S. Application Data

(63) Continuation of application No. 16/118,393, filed on Aug. 30, 2018, now abandoned.
(Continued)

(51) Int. Cl.
*A61B 5/00* (2006.01)
*A61B 5/0205* (2006.01)
(Continued)

(52) U.S. Cl.
CPC .......... *A61B 5/6851* (2013.01); *A61B 5/0084* (2013.01); *A61B 5/0205* (2013.01);
(Continued)

(58) Field of Classification Search
CPC ... A61B 5/6851; A61B 5/0084; A61B 5/0205; A61B 5/02055; A61B 5/02158; A61B 5/027; A61B 5/6886; A61B 5/0035; A61B 5/0066; A61B 5/01; A61B 5/0215; A61B 5/02152; A61B 5/055; A61B 8/0891; A61B 8/12; A61B 2562/0247; A61B 2562/12; A61B 2562/222; A61B 2562/225;
(Continued)

(56) References Cited

U.S. PATENT DOCUMENTS 5,632,643 A 5/1997 Shepherd
6,675,033 B1 1/2004 Lardo
(Continued)

FOREIGN PATENT DOCUMENTS

JP 2003302294 A 10/2003
WO 2017021834 A1 9/2017

*Primary Examiner* — Justin Xu

(57) ABSTRACT

Intravascular devices, systems and methods of fabricating the same are provided. In one embodiment, an intravascular system includes an intravascular guidewire that includes a flexible elongate member having a proximal portion and a distal portion, at least one electronic component secured to the distal portion of the flexible elongate member, and a locking section integral with a metal core of the flexible elongate member at the proximal portion of the flexible elongate member. The metal core has a first diameter. The locking section includes a first subsection and a second subsection. The first subsection has a second of diameter smaller than the first diameter and the second subsection transitions between the first diameter and the second diameter.

19 Claims, 15 Drawing Sheets

Related U.S. Application Data

(60) Provisional application No. 62/552,993, filed on Aug. 31, 2017.

(51) Int. Cl.
*A61B 5/0215* (2006.01)
*A61B 5/027* (2006.01)
*A61M 25/00* (2006.01)
*A61M 25/09* (2006.01)
*A61B 5/01* (2006.01)
*A61B 5/055* (2006.01)
*A61B 8/08* (2006.01)
*A61B 8/12* (2006.01)

(52) U.S. Cl.
CPC ...... *A61B 5/02055* (2013.01); *A61B 5/02158* (2013.01); *A61B 5/027* (2013.01); *A61B 5/6886* (2013.01); *A61M 25/09* (2013.01); *A61B 5/0035* (2013.01); *A61B 5/0066* (2013.01); *A61B 5/01* (2013.01); *A61B 5/0215* (2013.01); *A61B 5/02152* (2013.01); *A61B 5/055* (2013.01); *A61B 8/0891* (2013.01); *A61B 8/12* (2013.01); *A61B 2562/0247* (2013.01); *A61B 2562/12* (2013.01); *A61B 2562/222* (2013.01); *A61B 2562/225* (2013.01); *A61B 2562/227* (2013.01); *A61B 2562/228* (2013.01); *A61M 2025/0002* (2013.01); *A61M 2025/09108* (2013.01); *A61M 2025/09175* (2013.01)

(58) Field of Classification Search
CPC ....... A61B 2562/227; A61B 2562/228; A61M 25/09; A61M 2025/0002; A61M 2025/09108; A61M 2025/09175
See application file for complete search history.

(56) References Cited

U.S. PATENT DOCUMENTS

| | | | | |
|---|---|---|---|---|
| 6,761,696 | B1 * | 7/2004 | Wong | A61M 25/09 600/585 |
| 9,351,687 | B2 * | 5/2016 | Burkett | A61M 25/09 |
| 9,427,163 | B2 * | 8/2016 | Burkett | A61B 5/0084 |
| 10,179,225 | B2 * | 1/2019 | Sos | A61M 25/09041 |
| 2003/0028128 | A1 * | 2/2003 | Tenerz | A61M 25/09 600/585 |
| 2008/0058679 | A1 * | 3/2008 | Bakos | A61M 25/09 600/585 |
| 2010/0310304 | A1 * | 12/2010 | Kasper | G01R 33/3802 403/16 |
| 2011/0046494 | A1 | 2/2011 | Balji | |
| 2014/0005573 | A1 | 1/2014 | Burkett | |
| 2014/0187874 | A1 * | 7/2014 | Burkett | A61B 5/6851 600/301 |
| 2014/0188005 | A1 * | 7/2014 | Kay | A61M 25/09 600/585 |
| 2014/0276138 | A1 | 9/2014 | Millett | |
| 2014/0336620 | A1 * | 11/2014 | Layman | B23K 26/38 219/121.72 |
| 2015/0297138 | A1 * | 10/2015 | Burkett | A61B 5/6851 600/585 |
| 2016/0120408 | A1 * | 5/2016 | Bhagavatula | A61B 5/0084 600/476 |
| 2016/0296749 | A1 * | 10/2016 | Farr | H01R 43/16 |
| 2017/0086745 | A1 | 3/2017 | Burkett | |
| 2019/0183356 | A1 * | 6/2019 | Miyagawa | A61B 5/6851 |

* cited by examiner

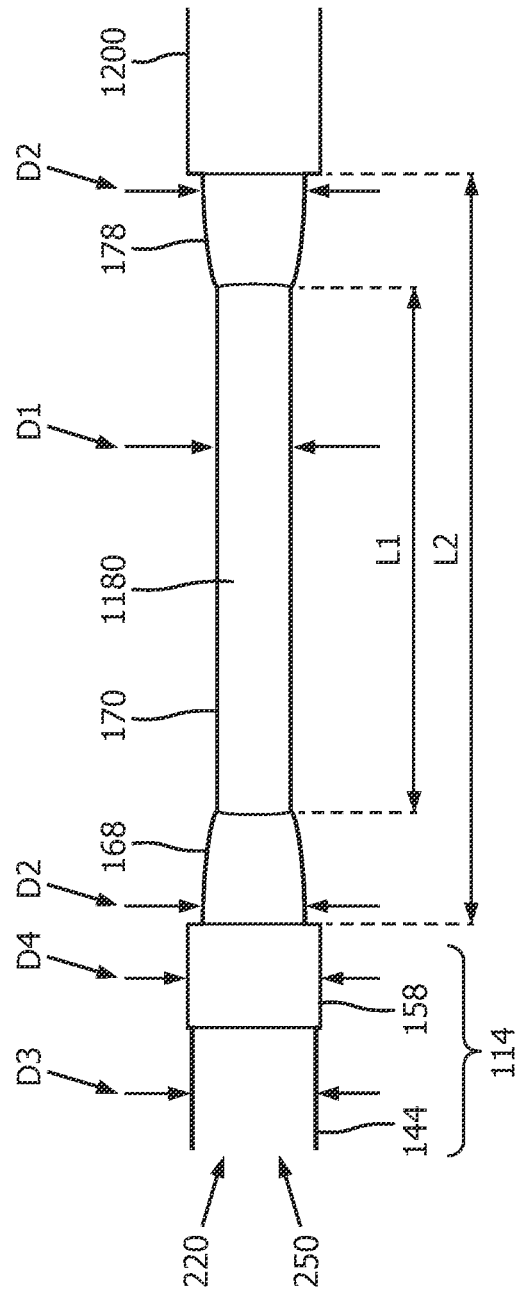
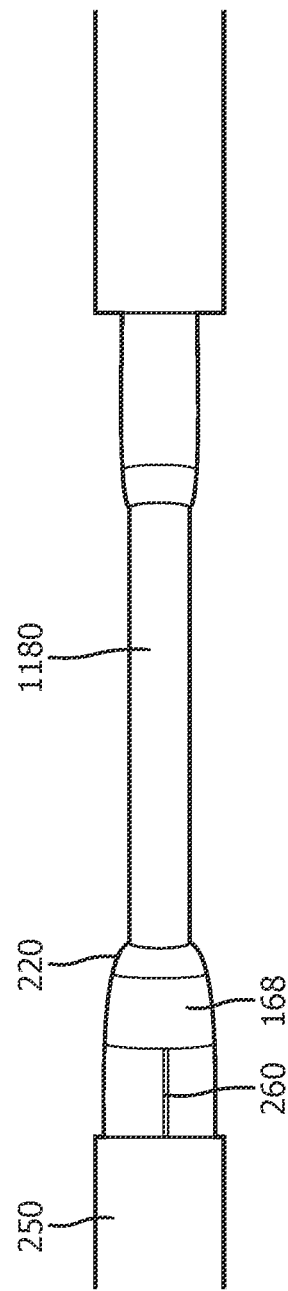
FIG. 8A
FIG. 8B

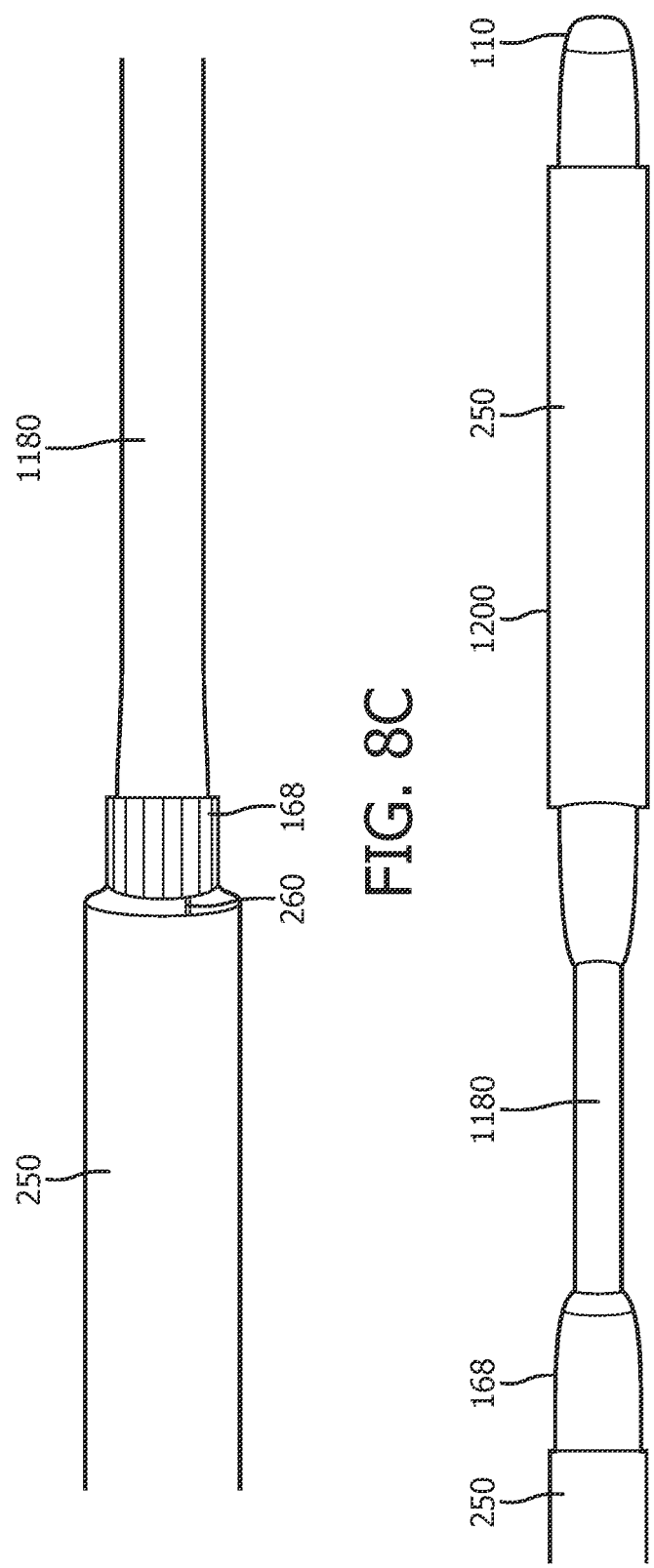

SENSING GUIDEWIRE WITH INTEGRATED PROXIMAL LOCKING FEATURE

CROSS-REFERENCE TO RELATED APPLICATIONS

The application is a continuation of U.S. application Ser. No. 16/118,393, filed Aug. 30, 2018, which claims priority to and the benefit of U.S. Provisional Application No. 62/552,993, filed Aug. 31, 2017, each of which is incorporated by reference herein in its entirety.

TECHNICAL FIELD

The present disclosure relates to intravascular devices, systems, and methods. In some embodiments, a guidewire includes a metal core with an integrated locking feature.

BACKGROUND

Heart disease is very serious and often requires emergency operations. A main cause of heart disease is the accumulation of plaque inside the blood vessels, which eventually occludes the blood vessels. Common treatment options available to open up the occluded vessel include balloon angioplasty, rotational atherectomy, and intravascular stents. Traditionally, surgeons have relied on X-ray fluoroscopic images that are planar images showing the external shape of the silhouette of the lumen of blood vessels to guide treatment. Unfortunately, with X-ray fluoroscopic images, there is a great deal of uncertainty about the exact extent and orientation of the stenosis responsible for the occlusion, making it difficult to find the exact location of the stenosis. In addition, though it is known that restenosis can occur at the same place, it is difficult to check the condition inside the vessels after surgery with X-ray.

A currently accepted technique for assessing the severity of a stenosis in a blood vessel, including ischemia causing lesions, is fractional flow reserve (FFR). FFR is a calculation of the ratio of a distal pressure measurement (taken on the distal side of the stenosis) relative to a proximal pressure measurement (taken on the proximal side of the stenosis). FFR provides an index of stenosis severity that allows determination as to whether the blockage limits blood flow within the vessel to an extent that treatment is required. The normal value of FFR in a healthy vessel is 1.00, while values less than about 0.80 are generally deemed significant and require treatment.

Often intravascular guidewires are utilized to measure the pressure within the blood vessel. For a guidewire equipped with a pressure sensor, segments of electrical contacts are usually arranged at the proximal portion of the guidewire. Proper alignment between electrical contacts of a connector and the electrical connects at the proximal portion of the guidewire are necessary to ensure reliable electrical connection.

SUMMARY

Embodiments of the present disclosure provide an improved intravascular system having an intravascular guidewire and a connector. The guidewire includes a flexible elongate member with a metal core. The flexible elongate member includes a locking section at a proximal portion of with a reduced diameter. The locking section is integral with the metal core and is formed by machining a portion of the metal core. An electronic component, such as a pressure sensor is located at the distal portion of the flexible elongate member. The connector includes a locking clip with a slit sized and shaped to receive the locking section at the proximal portion of the guidewire. Advantageously, the locking section can be received within the slit in the locking clip to ensure reliable electrical connection between conductive portions of the flexible elongate member and conductive contacts in the connector. In addition, as the locking section is integral with the metal core, it is less prone to failure, thus reducing possibility of having undesirable relative movement between the flexible elongate member and the connector.

In one embodiment, an intravascular system includes an intravascular guidewire that includes a flexible elongate member having a proximal portion and a distal portion, at least one electronic component secured to the distal portion of the flexible elongate member, and a locking section integral with a metal core of the flexible elongate member at the proximal portion of the flexible elongate member. The metal core has a first diameter. The locking section includes a first subsection and a second subsection. The first subsection has a second of diameter smaller than the first diameter and the second subsection transitions between the first diameter and the second diameter. In some embodiments, the proximal portion terminates at a proximal end that includes a first diameter. In some instances, the flexible elongate member further includes a polymer layer over the metal core and a plurality of conductive ribbons embedded within the polymer layer.

In some implementations, the proximal portion of the flexible elongate member includes an insulation layer formed over a proximal portion of the plurality of conductive ribbons. The insulation layer is distal to the locking section. In some other implementations, the proximal portion of the flexible elongate member includes a conductive portion in communication with one of the plurality of conductive ribbons. In some instances, the conductive portion includes a conductive ink. In other instances, the conductive portion includes a metal ring. In some embodiments, the metal core includes an electrical ground for the electronic component. In some embodiments of the intravascular system, the locking section further comprises a third subsection. In those embodiments, the first subsection is between the second subsection and the third subsection. The second subsection includes a first taper, with a distal end of the first taper having the second diameter and a proximal end of the first taper having the first diameter. The third subsection includes a second taper, with a distal end of the second taper having the first diameter and a proximal end of the second taper having the second diameter. In some other embodiments, the intravascular system further includes a connector for coupling to the proximal portion of the flexible elongate member. The connector includes a locking clip having a slit sized and shaped to receive the locking section of the flexible elongate member. In those embodiments, the locking clip includes a top portion tilting proximally at a tilt angle.

In yet another embodiment, a method of fabricating an intravascular guidewire is provided. The method includes providing a flexible elongate member having a proximal portion and a distal portion, wherein the flexible elongate member comprises a metal core and a polymer layer over the metal core, the metal core having a first diameter; securing at least one electronic component to the distal portion of the flexible elongate member; and forming a locking section in the proximal portion of the flexible elongate member by machining around a circumference of the flexible elongate member to remove a portion of the polymer layer and a portion of the metal core in the locking section. In some instances, the flexible elongate member further comprises a plurality of conductive ribbons embedded within the polymer layer. In some embodiments, forming the locking section further includes machining around a circumference of the flexible elongate member to remove a portion of the plurality of conductive ribbons in the locking section. In some other embodiments, the method further includes forming an insulation layer over a proximal portion of the plurality of conductive ribbons, where the insulation layer is distal to the locking section. In some implementations, the method also includes removing a portion of the polymer layer over a conductive portion of the flexible elongate member such that one of the plurality of conductive ribbons is exposed, the conductive portion being adjacent to the locking section; and forming a conductive layer over the exposed conductive ribbon. In some instances, the conductive layer includes a conductive ink. In other instances, the conductive layer includes a metal ring. In some embodiments, the method further includes machining a first subsection of the locking section until the first subsection has a second diameter smaller than the first diameter; and machining a second subsection such that the second subsection transitions between the first diameter and the second diameter.

Additional aspects, features, and advantages of the present disclosure will become apparent from the following detailed description.

BRIEF DESCRIPTION OF THE DRAWINGS

Illustrative embodiments of the present disclosure will be described with reference to the accompanying drawings, of which:

FIG. 8A is a picture of a locking section of an intravascular device, according to aspects of the present disclosure.

FIG. 8B is a picture of a locking section of an intravascular device, according to aspects of the present disclosure.

FIG. 8C is a picture of a locking section of an intravascular device, according to aspects of the present disclosure.

FIG. 8D is a picture of a locking section and a proximal section of an intravascular device, according to aspects of the present disclosure.

DETAILED DESCRIPTION

Figure 1:
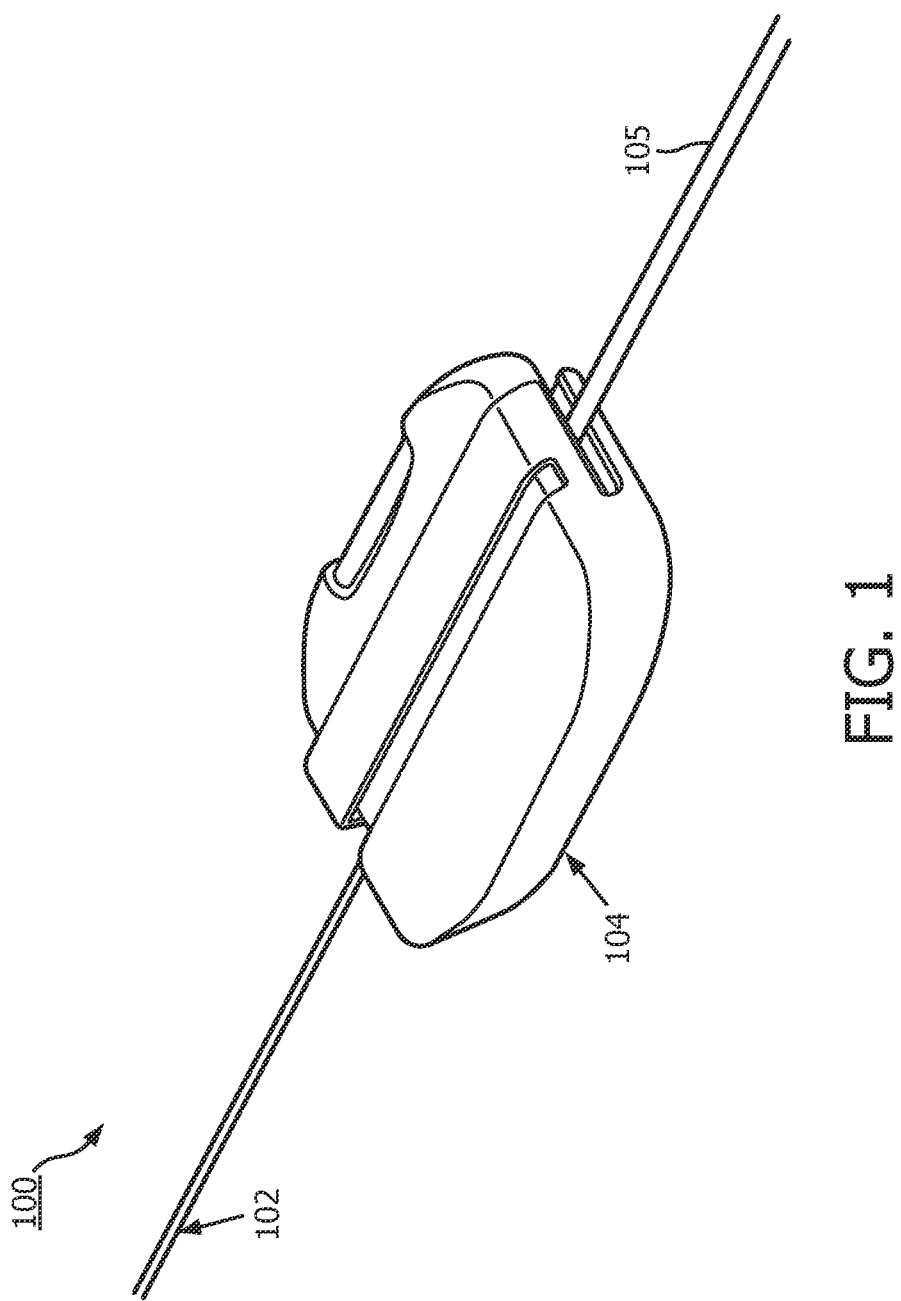
FIG. 1 is a diagrammatic perspective view of an intravascular system, according to aspects of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

As used herein, "flexible elongate member" or "elongate flexible member" includes at least any thin, long, flexible structure that can be inserted into the vasculature of a patient. While the illustrated embodiments of the "flexible elongate members" of the present disclosure have a cylindrical profile with a circular cross-sectional profile that defines an outer diameter of the flexible elongate member, in other instances all or a portion of the flexible elongate members may have other geometric cross-sectional profiles (e.g., oval, rectangular, square, elliptical, etc.) or non-geometric cross-sectional profiles. Flexible elongate members include, for example, intravascular catheters and intravascular guidewires. In that regard, intravascular catheters may or may not include a lumen extending along its length for receiving and/or guiding other instruments. If the intravascular catheter includes a lumen, the lumen may be centered or offset with respect to the cross-sectional profile of the device.

In most embodiments, the flexible elongate members of the present disclosure include one or more electronic, optical, or electro-optical components. For example, without limitation, a flexible elongate member may include one or more of the following types of components: a pressure sensor, a flow sensor, a temperature sensor, an imaging element, an optical fiber, an ultrasound transducer, a reflector, a mirror, a prism, an ablation element, a radio frequency (RF) electrode, a conductor, and/or combinations thereof. Generally, these components are configured to obtain data related to a vessel or other portion of the anatomy in which the flexible elongate member is disposed. Often the components are also configured to communicate the data to an external device for processing and/or display. In some aspects, embodiments of the present disclosure include imaging devices for imaging within the lumen of a vessel, including both medical and non-medical applications. However, some embodiments of the present disclosure are particularly suited for use in the context of human vasculature. Imaging of the intravascular space, particularly the interior walls of human vasculature can be accomplished by a number of different techniques, including ultrasound (often referred to as intravascular ultrasound ("IVUS") and intracardiac echocardiography ("ICE")) and optical coherence tomography ("OCT"). In other instances, infrared, thermal, or other imaging modalities are utilized. Further, in some instances the flexible elongate member includes multiple electronic, optical, and/or electro-optical components (e.g., pressure sensors, temperature sensors, imaging elements, optical fibers, ultrasound transducers, reflectors, mirrors, prisms, ablation elements, RF electrodes, conductors, etc.).

The electronic, optical, and/or electro-optical components of the present disclosure are often disposed within a distal portion of the flexible elongate member. As used herein, "distal portion" of the flexible elongate member includes any portion of the flexible elongate member from the mid-point to the distal tip. As flexible elongate members can be solid, some embodiments of the present disclosure will include a housing portion at the distal portion for receiving the electronic components. Such housing portions can be tubular structures attached to the distal portion of the elongate member. Some flexible elongate members are tubular and have one or more lumens in which the electronic components can be positioned within the distal portion.

The electronic, optical, and/or electro-optical components and the associated communication lines are sized and shaped to allow for the diameter of the flexible elongate member to be very small. For example, the outside diameter of the elongate member, such as a guidewire or catheter, containing one or more electronic, optical, and/or electro-optical components as described herein are between about 0.0007" (0.0178 mm) and about 0.118" (3.0 mm), with some particular embodiments having outer diameters of approximately 0.014" (0.3556 mm) and approximately 0.018" (0.4572 mm)). As such, the flexible elongate members incorporating the electronic, optical, and/or electro-optical component(s) of the present application are suitable for use in a wide variety of lumens within a human patient besides those that are part or immediately surround the heart, including veins and arteries of the extremities, renal arteries, blood vessels in and around the brain, and other lumens.

"Connected" and variations thereof as used herein includes direct connections, such as being glued or otherwise fastened directly to, on, within, etc. another element, as well as indirect connections where one or more elements are disposed between the connected elements.

"Secured" and variations thereof as used herein includes methods by which an element is directly secured to another element, such as being glued or otherwise fastened directly to, on, within, etc. another element, as well as indirect techniques of securing two elements together where one or more elements are disposed between the secured elements.

Referring initially to FIG. 1, shown therein is an intravascular system 100 according to an embodiment of the present disclosure. In that regard, the intravascular system includes an intravascular device 102 and a connector 104. As will be discussed in greater detail below, a communication cable 105 extends from the connector 104 in a direction coaxial with or parallel to the longitudinal axis of the intravascular device 102. As a result of the communication cable 105 extending coaxial with or parallel to the intravascular device, the connector 104 and communication cable 105 are less likely to catch on a patient, patient's clothing, medical equipment (including tubes, catheters, wires, leads, etc.) and/or other structures in the procedure room when maneuvering the intravascular device 102.

Figure 2:
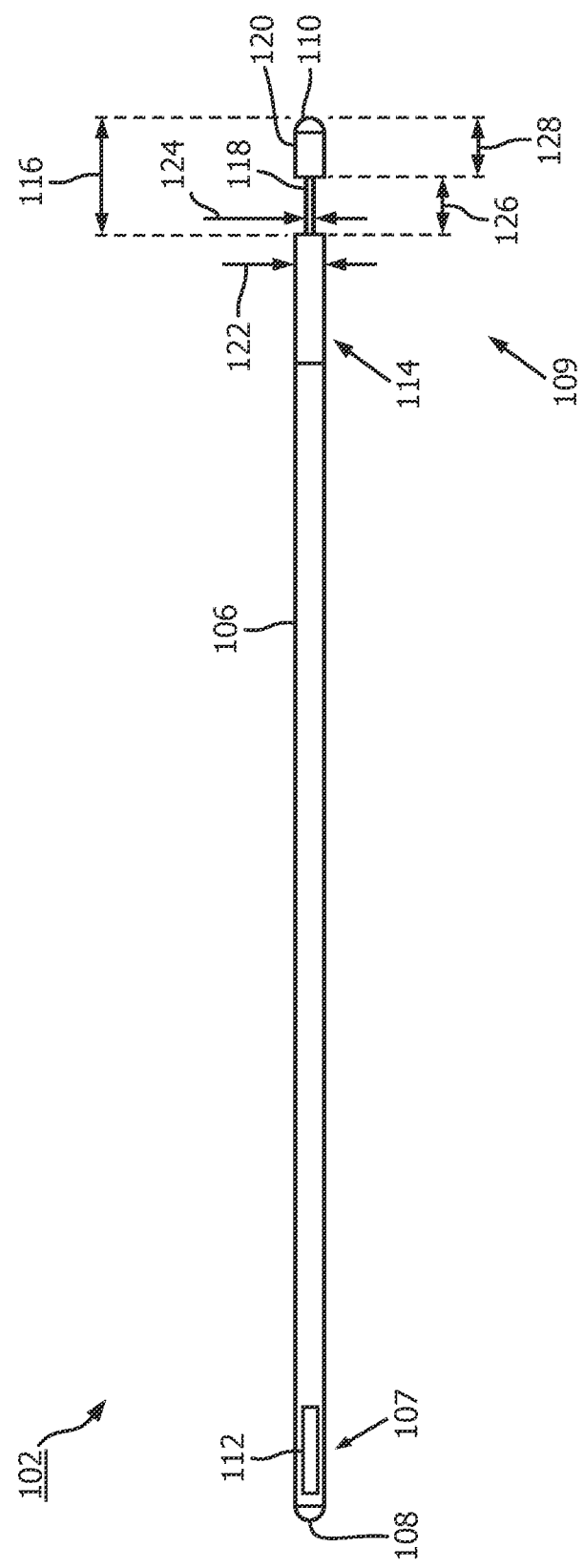
FIG. 2 is a diagrammatic side view of an intravascular device of the intravascular system of FIG. 1, according to aspects of the present disclosure.

Referring now to FIG. 2, a side view of the intravascular device 102 is provided according to an embodiment of the present disclosure. As shown, the intravascular device 102 includes a flexible elongate member 106 having a distal portion 107 adjacent a distal end 108 and a proximal portion 109 adjacent a proximal end 110. A component 112 is positioned within the distal portion 107 of the flexible elongate member 106 proximal of the distal tip 108. Generally, the component 112 is representative of one or more electronic, optical, or electro-optical components. In that regard, the component 112 can include a pressure sensor, a flow sensor, a temperature sensor, an imaging element, an optical fiber, an ultrasound transducer, a reflector, a mirror, a prism, an ablation element, an RF electrode, a conductor, and/or combinations thereof. The specific type of component or combination of components can be selected based on an intended use of the intravascular device. In some instances, the component 112 is positioned less than 10 cm, less than 5, or less than 3 cm from the distal tip 108. In some instances, the component 112 is positioned within a housing of the intravascular device 102. In that regard, the housing can be a separate component secured to the flexible elongate member 106 in some instances. In other instances, the housing can be integrally formed as a part of the flexible elongate member 106.

The intravascular device 102 also includes a connection portion 114 adjacent the proximal portion 109 of the device. In that regard, the connection portion 114 can be spaced from the proximal end 110 of the flexible elongate member 106 by a distance 116. Generally, the distance 116 is between 0% and 50% of the total length of the flexible elongate member 106. While the total length of the flexible elongate member can be any length, in some embodiments the total length is between about 1300 mm and about 4000 mm, with some specific embodiments having a length of 1400 mm, 1900 mm, and 3000 mm. In some instances the connection portion 114 is spaced from the proximal end 110 between about 0 mm and about 1400 mm. In some specific embodiments, the connection portion 114 is spaced from the proximal end by a distance of 0 mm, 300 mm, and 1400 mm. Accordingly, in some instances the connection portion 114 is positioned at the proximal end 110. In some such embodiments, one or more aspects of the engagement and alignment features of the intravascular device 102 discussed below are positioned distal of the of the connection portion 114 instead of proximal of the connection portion 114 as shown in the embodiment of FIG. 2, or the engagement and alignment features may be omitted entirely.

In the illustrated embodiment of FIG. 2 the intravascular device 102 includes a locking section 118 extending proximally from the connection portion 114 to another section 120 that extends to proximal end 110. In the illustrated embodiment, the section 120 is rounded to proximal end 110. In other embodiments, the section 120 has a tapered, arcuate, and/or other changing profile as it extends proximally to proximal end 110. In that regard, in some instances the outer profile and/or diameter of the section 120 reduces as it extends proximally to proximal end 110 such that the reduced profile and/or diameter of the proximal end facilitates easier introduction of one or more other instruments over the intravascular device. In other embodiments, the section 120 has a constant profile as it extends proximally to proximal end 110. As section 120 is proximal to the locking section 118, it is sometimes referred to as the proximal section.

As shown, the connection portion 114 has a diameter 122 (or other similar measurement for outer cross-section profiles for non-circular cross-sectional embodiments) while locking section 118 has a diameter 124 (again, or other similar measurement for outer cross-section profiles for non-circular cross-sectional embodiments). The diameter 124 of locking section 118 is different than the diameter 122 of connection portion 114. In that regard, the different sizes of the diameters 122, 124 create a structure that is configured to facilitate alignment and/or connection of the intravascular device 102 to a connector, such as connector 104. In the illustrated embodiment, the diameter 124 of locking section 118 is less than the diameter 122 of the connection portion 114. In some embodiments, the diameter 124 of locking section 118 is between about 40% and about 80% of diameter 122, with some particular embodiments being about 42%, 64%, and/or other percentage of diameter 122. In that regard, in some embodiments the diameter 122 of connection portion 114 is between about 0.0178 mm and about 3.0 mm, with some particular embodiments being 0.3556 mm (0.014"), 0.4572 mm (0.018") and 0.889 mm (0.035"). Accordingly, in some embodiments the diameter 124 of locking section 118 is between about 0.007 mm and about 2.4 mm, with some particular embodiments being 0.186 mm (0.0073"), 0.23 mm, and 0.50 mm. In the illustrated embodiment, section 120 has a diameter that is approximately equal to diameter 122 and, therefore, greater than diameter 124. However, in other embodiments, section 120 has a diameter that is greater than diameter 122, less than diameter 122, greater than diameter 124, equal to diameter 124, and/or less than diameter 124. In some embodiments, locking section 118 is a section of a core wire extending through the connection portion 114. Locking section 118 and section 120 together can sometimes to be referred to as the locking feature.

As shown in FIG. 2, the locking section 118 extends proximally from connection portion 114 a distance 126, while section 120 extends proximally from locking section 118 to proximal end 110 a distance 128. Together, distances 126 and 128 equal the distance 116 that the connection portion 114 is spaced from the proximal end 110 of the intravascular device 102. In some instances, the distance 126 is between about 0.508 mm (0.020") and about 2.54 mm (0.10"), with some particular embodiments being 0.762 mm (0.030"), 1.016 mm (0.040"), and 1.524 mm (0.060"). Further, while the transition between connection portion 114 and locking section 118 and the transition between locking section 118 and section 120 are shown as being stepped in the illustrated embodiments, in other embodiments the transitions are tapered and/or otherwise make a gradual change in outer diameter along the length of the intravascular device. In some embodiments, use of tapered and/or gradual transitions results in the proximal portion of the intravascular device 102 not having any sharp edges. In some implementations, the use of tapered and/or gradual transitions for one or both of the transitions between locking section 118 and either the connection portion 114 or section 120 makes cleaning the proximal portion of the device (e.g., to remove any liquids or other unwanted materials on the surface of the proximal portion of the intravascular device) easier. In some embodiments, the intravascular system 100 can include one or more features described in U.S. patent application Ser. No. 15/374,312, titled "SIDE-LOADING CONNECTORS FOR USE WITH INTRAVASCULAR DEVICES AND ASSOCIATED SYSTEMS AND METHODS," filed Dec. 9, 2016, which is hereby incorporated by reference in its entirety.

The connection portion 114 is configured to facilitate communication between the intravascular device 102 and another device. More specifically, in some embodiments the connection portion 114 is configured to facilitate communication of data obtained by the component 112 to another device, such as a computing device or processor. Accordingly, in some embodiments, the connection portion 114 includes one or more conductive portions. In some implementations, the connection portion 114 can include conductive bands, rings, coatings, coils, etc. In some instances, the connection portion 114 includes one or more electrical connectors, or conductive portions, as described in U.S. patent application Ser. No. 13/931,052, titled "INTRAVASCULAR DEVICES, SYSTEMS, AND METHODS," filed Jun. 28, 2013, which is hereby incorporated by reference in its entirety. In other embodiments, the connection portion 114 includes an optical connector. In such instances, the connection portion 114 provides an optical connection to one or more optical communication pathways (e.g., fiber optic cable) that extend along the length of the flexible elongate member 106 and are optically coupled to the component 112. Further, in some embodiments the connection portion 114 provides both electrical and optical connections to both electrical conductor(s) and optical communication pathway(s) coupled to the component 112. In that regard, it should again be noted that component 112 can be comprised of a plurality of elements in some instances. In some instances, the connection portion 114 can be configured to provide a physical connection to another device, either directly or indirectly. In other instances, the connection portion 114 can be configured to facilitate wireless communication between the intravascular device 102 and another device. Generally, any current or future developed wireless protocol(s) may be utilized. In yet other instances, the connection portion 114 facilitates both physical and wireless connection to another device.

As noted above, in some instances the connection portion 114 provides a connection between the component 112 of the intravascular device 102 and an external device. Accordingly, in some embodiments one or more electrical conductors, one or more optical pathways, and/or combinations thereof extend along the length of the flexible elongate member 106 between the connection portion 114 and the component 112 to facilitate communication between the connection portion 114 and the component 112. Generally, any number of electrical conductors, optical pathways, and/or combinations thereof can extend along the length of the flexible elongate member 106 between the connection portion 114 and the component 112. In some instances, between one and ten electrical conductors (or conductive portions) and/or optical pathways extend along the length of the flexible elongate member 106 between the connection portion 114 and the component 112. For the sake of clarity and simplicity, the embodiments of the present disclosure described below include three electrical conductors and, therefore, the connection portion 114 is described as having three separate conductive portions corresponding to the three electrical conductors.

In some embodiments, the flexible elongate member 106 includes multiple core wires. For example, the flexible elongate member 106 can include a proximal core wire (or proximal core) and a distal core wire (or distal core) that are attached to one another. The components associated with the proximal portion of the intravascular device 102 (e.g., including the proximal core wire) can be referred to a proximal subassembly, and the components associated with the distal portion of the intravascular device 102 (e.g., including the distal core wire) can be referred to a distal subassembly. The flexible elongate member can refer to one or more components of the proximal subassembly and/or the distal subassembly. In some embodiments, the flexible elongate member 106 includes features as described in U.S. patent application Ser. No. 13/931,052, titled "INTRAVASCULAR DEVICE, SYSTEMS, AND METHODS" and filed Jun. 28, 2013, which is hereby incorporated by reference in its entirety.

Figure 3:
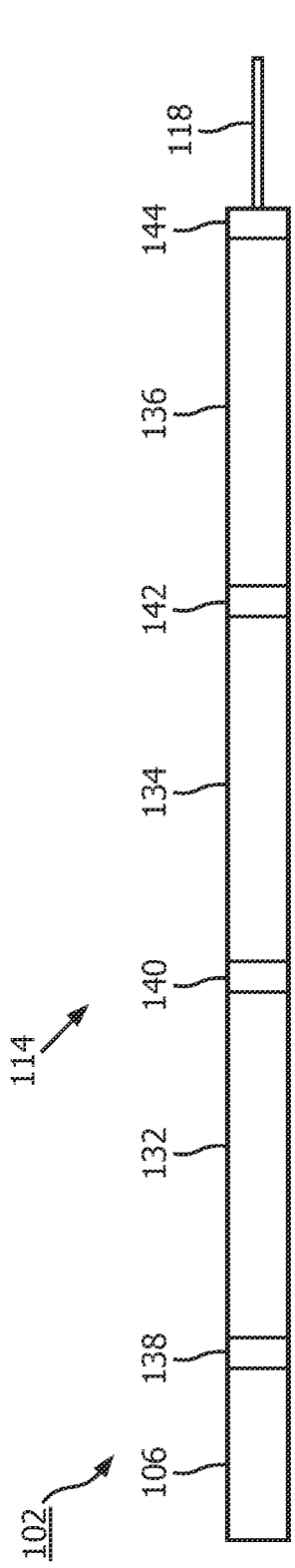
FIG. 3 is a diagrammatic side view of a proximal connection portion of an intravascular device, according to aspects of the present disclosure.
Figure 4:
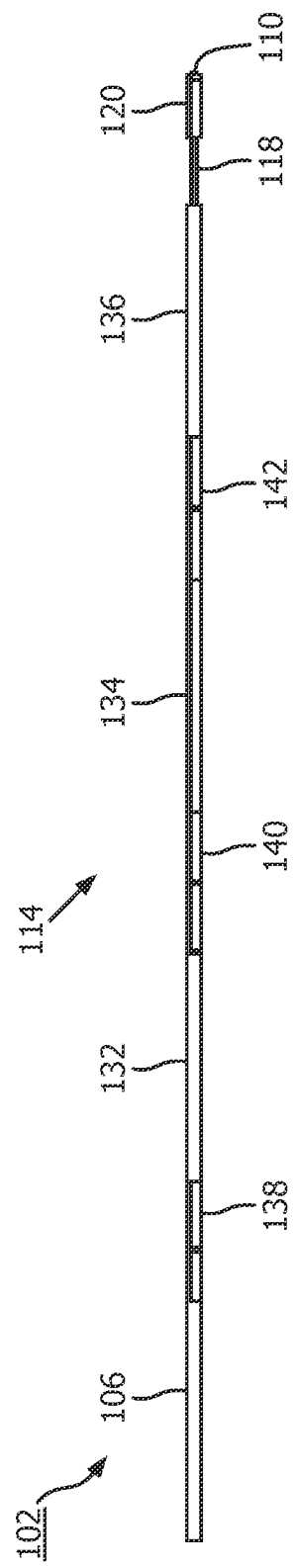
FIG. 4 is a diagrammatic side view of a proximal connection portion and locking features of an intravascular device, according to aspects of the present disclosure.

For example, as shown in FIG. 3, in some instances the connection portion 114 includes conductive portions 132, 134, and 136 that are separated from one another and the main body of the flexible elongate member 106 by insulating portions 138, 140, 142, and 144. In that regard, the conductive portions 132, 134, and 136 are formed of a conductive material and are portions of a hypotube, a coil, conductive ink, conductive coating formed over a tubular member, and/or combinations thereof in some instances. In some embodiments, the conductive portions 132, 134 and 136 include features as described in U.S. patent application Ser. No. 14/143,304, titled "INTRAVASCULAR DEVICES, SYSTEMS, AND METHODS" and filed Dec. 30, 2013, which is hereby incorporated by reference in its entirety. It is understood that the total number of communication pathways and/or the number of electrical conductors and/or optical pathways is different in other embodiments and, therefore, the number of conductive portions (or optical connectors) included in connection portion is different as well. More specifically, the number of communication pathways and the number of electrical conductors and optical pathways extending along the length of the flexible elongate member 106 can be selected based on the desired functionality of the component 112 and the corresponding elements that define component 112 to provide such functionality. As a result, the number and type of connections provided by connection portion 114 are likewise determined by the desired functionality of the component 112, the corresponding elements that define component 112 to provide such functionality, and the communication needs for such elements. Further still, in some instances, one or more of the insulating portions 138, 140, 142, and 144 is omitted. For example, as shown in the exemplary embodiment of FIG. 4, insulating portion 144 has been omitted.

Figure 5:
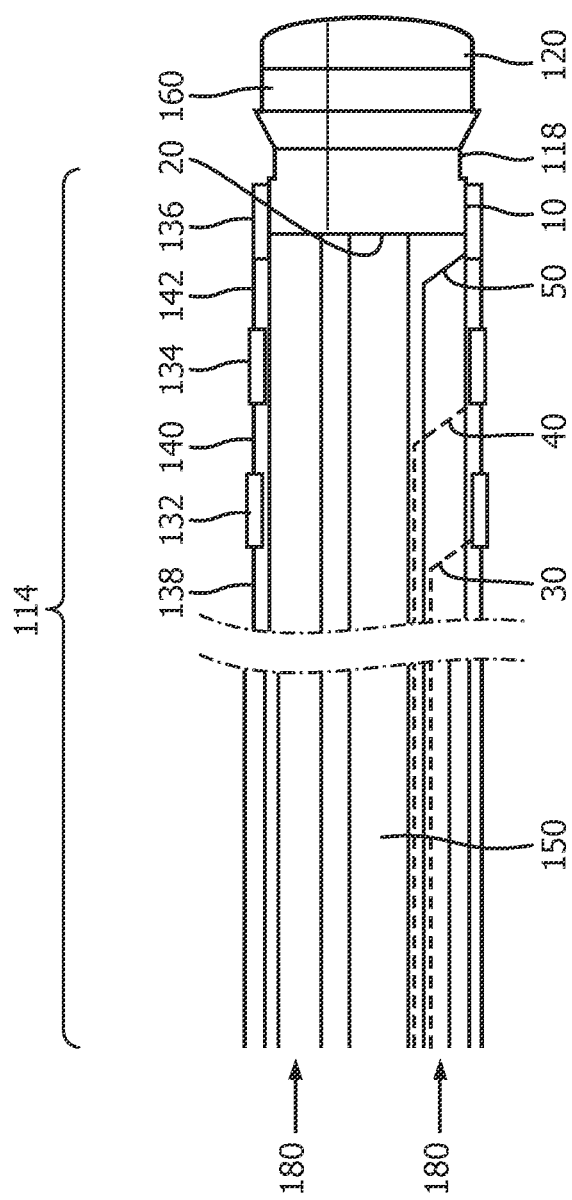
FIG. 5 is a diagrammatic cross-sectional view of a proximal connection portion and locking features of an intravascular device.

Referring now to FIG. 5, shown therein is a diagrammatic cross-sectional view of the connection portion 114, locking section 118 and section 120 of the intravascular device 102. In some embodiments, the connection portion 114 includes three conductive portions 132, 134, and 136 that are separated from one another and the main body of the flexible elongate member 106 by insulating portions 138, 140, and 142. As the conductive portions 132, 134 and 136 and the insulating portions 138, 140 and 142 are in annular-ring shapes around a circumference of the flexible elongate member 106, cross sections of them appear on either side of the connection portion 114. Each of the conductive portions 132, 134 and 136 is electrically coupled to a conductive ribbon. In the example shown in FIG. 5, conductive portion 132 is electrically coupled to conductive wire 30, conductive portion 134 is electrically coupled to conductive wire 40, and conductive portion 136 is electrically coupled to conductive wire 50. In some instances, the conductive wires 30, 40 and 50 are embedded within a polymer layer 180. Conductive wires 30, 40 and 50 are electrically coupled to component 112 and extend proximally through the flexible elongate member 106. The polymer layer 180 insulates the conductive wires 30, 40 and 50 from one another and also insulates the conductive wires 30, 40 and 50 from the metal core 150. In some embodiments, the flexible elongate member 106 includes a metal core 150 that extends through the conductive portion 114. In some implementations, locking section 118 and section 120 are parts of an integral component referred to as a locking core 160. Locking core 160 is separate from the metal core 150 and is attached by soldering to the proximal end of the connection portion 114 at interface 10 with conductive portion 136 and at interface 20 with a proximal end of the metal core 150. While the soldering attachment at interfaces 10 and 20 are generally mechanically sound, they present possible points of failure. When the soldering attachment at interfaces 10 and 20 fails, the flexible elongate member 106 would be movable longitudinally and conductive portions 132, 134, and 136 would be out of alignment with corresponding electrical contacts of the connector 104.

Figure 6:
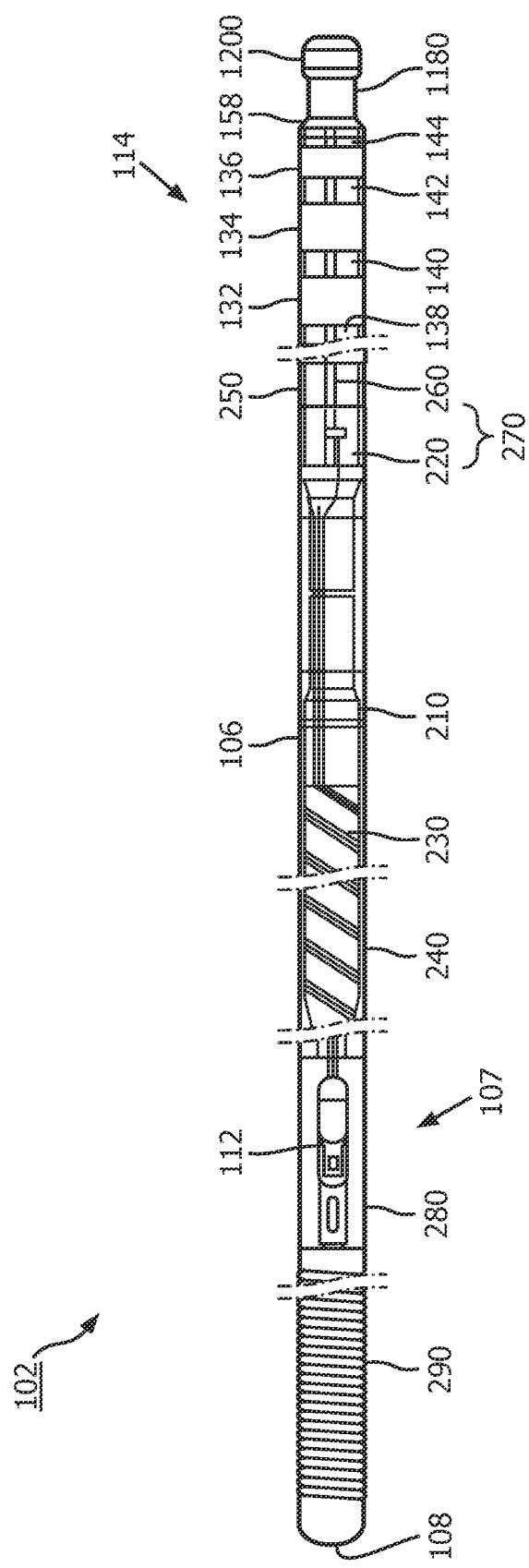
FIG. 6 is a diagrammatic top view of an intravascular device, according to aspects of the present disclosure.

Referring now to FIG. 6, shown there is a diagrammatic top view of intravascular device 102, according to aspects of the present disclosure. The intravascular device 102 can be an intravascular guidewire sized and shaped for positioning within a vessel of a patient. The intravascular device 102 can include the electronic component 112. For example, the electronic component 112 can be a pressure sensor configured to measure a pressure of blood flow within the vessel of the patient. The intravascular device 102 includes the flexible elongate member 106. The electronic component 112 is disposed at the distal portion 107 of the flexible elongate member 106. The electronic component 112 can be mounted at the distal portion 107 within a housing 280 in some embodiments. A flexible tip coil 290 extends between the housing 280 and the distal end 108. The connection portion 114 is disposed at the proximal portion 109 of the flexible elongate member 106. The connection portion includes the conductive portions 132, 134, 136. In some embodiments, the conductive portions 132, 134, 136 can be conductive ink that is printed and/or deposited around the flexible elongate member. In some embodiments, the conductive portions 132, 134, 136 are conductive, metallic rings that are positioned around the flexible elongate member. The locking section 118 and section 120 are disposed at the proximal portion 109 of the flexible elongate member 106.

The intravascular device 102 in FIG. 6 includes a distal core 210 and a proximal core 220. The distal core 210 and the proximal core 220 are metallic components forming part of the body of the intravascular device 102. For example, the distal core 210 and the proximal core 220 are flexible metallic rods that provide structure for the flexible elongate member 106. The diameter of the distal core 210 and the proximal core 220 can vary along its length.

In some embodiments, the intravascular device 102 comprises a distal assembly and a proximal assembly that are electrically and mechanically joined together, which results in electrical communication between the electronic component 112 and the conductive portions 132, 134, 136. For example, pressure data obtained by the electronic component 112 (in this example, electronic component 112 is a pressure sensor) can be transmitted to the conductive portions 132, 134, 136. Control signals from a computer in communication with the intravascular device 102 can be transmitted to the electronic component 112 via the conductive portions 132, 134, 136. The distal subassembly can include the distal core 210. The distal subassembly can also include the electronic component 112, the conductive members 230, and/or one or more layers of polymer/plastic 240 surrounding the conductive members 230 and the core 210. For example, the polymer/plastic layer(s) can protect the conductive members 230. The proximal subassembly can include the proximal core 220. The proximal subassembly can also include one or more layers of polymer layer(s) 250 (hereinafter polymer layer 250) surrounding the proximal core 220 and/or conductive ribbons 260 embedded within the one or more layers of polymer layer(s) 250. In some embodiments, the proximal subassembly and the distal subassembly can be separately manufactured. During the assembly process for the intravascular device 102, the proximal subassembly and the distal subassembly can be electrically and mechanically joined together. As used herein, flexible elongate member can refer to one or more components along the entire length of the intravascular device 102, one or more components of the proximal subassembly (e.g., including the proximal core 220, etc.), and/or one or more components the distal subassembly 210 (e.g., including the distal core 210, etc.).

In various embodiments, the intravascular device 102 can include one, two, three, or more core wires extending along its length. For example, a single core wire can extend substantially along the entire length of the flexible elongate member 106. In such embodiments, a locking section 1180 and a section 1200 can be integrally formed at the proximal portion of the single core wire. The electronic component 112 can be secured at the distal portion of the single core wire. In other embodiments, such as the embodiment illustrated in FIG. 6, the locking section 1180 and the section 1200 can be integrally formed at the proximal portion of the proximal core 220. The electronic component 112 can be secured at the distal portion of the distal core 210. The intravascular device 102 includes one or more conductive members 230 in communication with the electronic component 112. For example, the conductive members 230 can be one or more electrical wires that are directly in communication with the electronic component 112. In some instances, the conductive members 230 are electrically and mechanically coupled to the electronic component 112 by, e.g., soldering. In some instances, the conductive members 230 comprise two or three electrical wires (e.g., a bifilar cable or a trifilar cable). An individual electrical wire can include a bare metallic conductor surrounded by one or more insulating layers. The conductive members 230 can extend along the length of the distal core 210. For example, at least a portion of the conductive members 230 can be spirally wrapped around the distal core 210.

The intravascular device 102 includes one or more conductive ribbons 260 at the proximal portion of the flexible elongate member 106. The conductive ribbons 260 are embedded within polymer layer(s) 250. The conductive ribbons 260 are directly in communication with the conductive portions 132, 134, and/or 136. In some instances, the conductive members 230 are electrically and mechanically coupled to the electronic component 112 by, e.g., soldering. In some instances, the conductive portions 132, 134, and/or 136 comprise conductive ink (e.g., metallic nano-ink, such as silver or gold nano-ink) that is deposited or printed directed over the conductive ribbons 260.

As described herein, electrical communication between the conductive members 230 and the conductive ribbons 260 can be established at the connection region 270 of the flexible elongate member 106. By establishing electrical communication between the conductive members 230 and the conductive ribbons 260, the conductive portions 132, 134, 136 can be in electrically communication with the electronic component 112.

In some embodiments represented by FIG. 6, intravascular device 102 includes a locking section 1180 and a section 1200. Different from the locking core 160 (including locking section 118 and section 120) in FIG. 5, which is soldered to metal core 150, locking section 1180 and section 1200 in FIG. 6 are integral with proximal core 220. To form locking section 1180, a machining process is necessary to remove polymer layer 250 and conductive ribbons 260 in locking section 1180 and to shape proximal core 220 in locking section 1180 to the desired shape. As shown in FIG. 6, locking section 1180 includes a reduced diameter while section 1200 has a diameter substantially similar to that of proximal core 220 in the connection portion 114. In some instances, because the machining process removes conductive ribbons in locking section 1180, proximal ends of the conductive ribbons 260 would be exposed to moisture and/or liquids, such as blood, saline solutions, disinfectants, and/or enzyme cleaner solutions, an insulation layer 158 is formed over the proximal end portion of the connection portion 114 to insulate the exposed conductive ribbons.

Figure 7A:
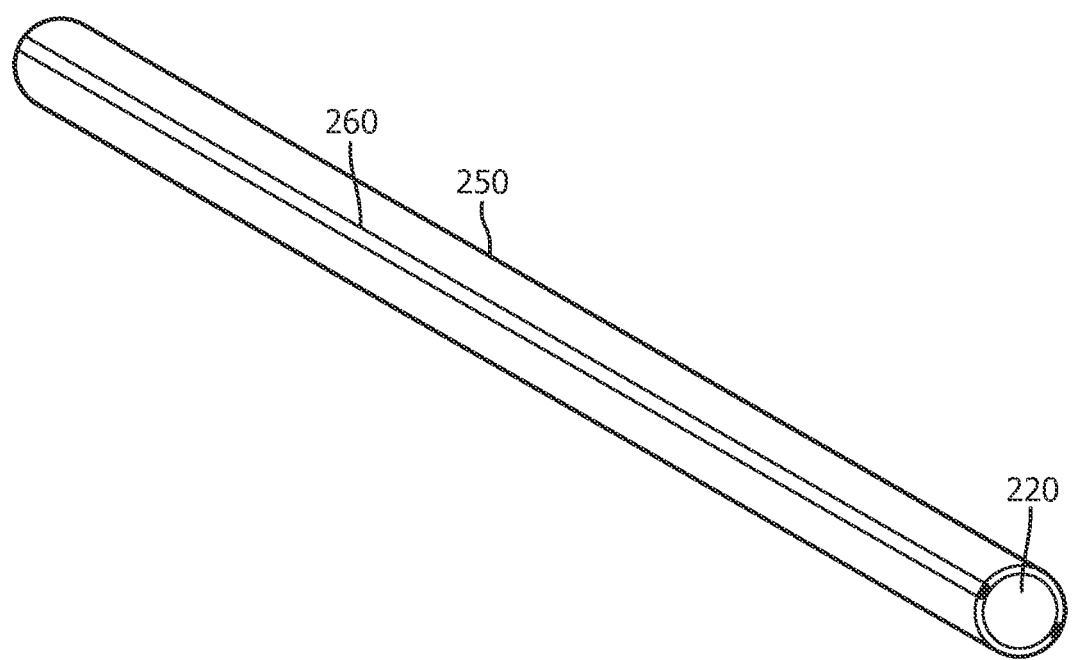
FIG. 7A is a diagrammatic perspective view of a proximal flexible elongate member, according to aspects of the present disclosure.
Figure 7B:
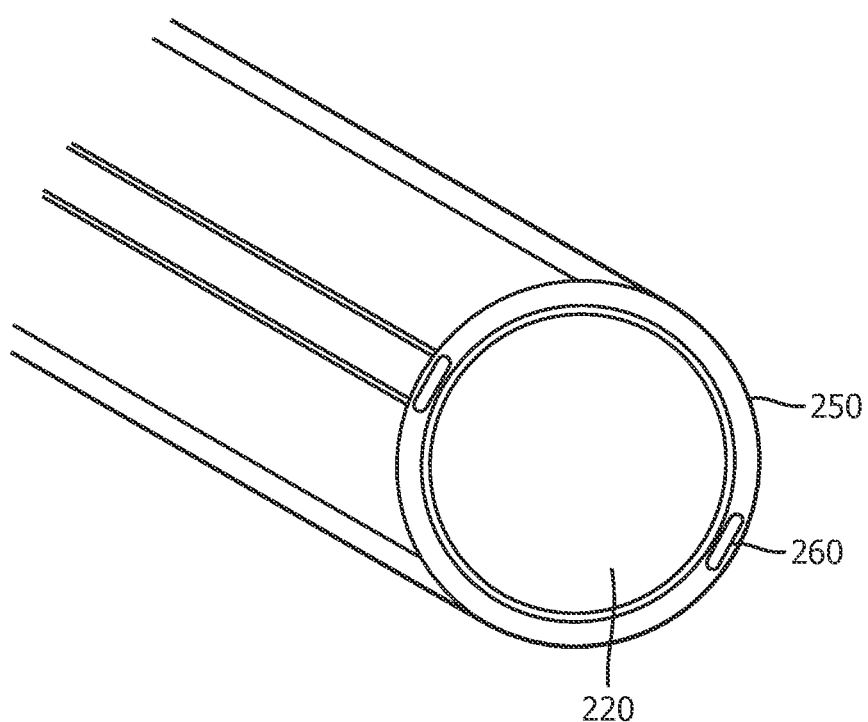
FIG. 7B is an enlarged diagrammatic perspective view of a portion of the proximal flexible elongate member indicated in FIG. 7A, according to aspects of the present disclosure.

FIGS. 7A and 7B illustrate perspective views of a proximal subassembly of the intravascular device 102. The proximal subassembly includes including the proximal core 220. The proximal core 220 can be made of a metal or metal alloy in some embodiments, such as nickel-cobalt base alloy (e.g., MP35N). The diameter of the proximal core 220 can be between 0.0100 and 0.0110, including values such as 0.0105", 0.0107", 0.0109" in some embodiments. The one or more polymer layers 250 surround the proximal core 220. The layer 250 can include polyimide in some embodiments. One or more metallic, conductive ribbons 260 are embedded within the polymer layer(s) 250. For example, the proximal subassembly can include two conductive ribbons 260. The polymer layer(s) 250 can electrically isolate the conductive ribbons 260 from the proximal core 220. Any suitable process (e.g. grinding, ablating, etc.) for removing a portion of the polymer layer(s) 250 can be used to expose portions of the conductive ribbons 260. Electrical communication with the conductive ribbons 260 can be established at the exposed portions of the conductive ribbons 260. In some embodiments, the proximal subassembly can include features as described in U.S. patent application Ser. No. 14/143,304, titled "INTRAVASCULAR DEVICES, SYSTEMS, AND METHODS" and filed Dec. 30, 2013, which is hereby incorporated by reference in its entirety.

FIG. 8A is a picture of locking section 1180 of the intravascular device 102, according to aspects of the present disclosure. In some embodiments, while the entire locking section 1180 is integral with proximal core 220 extending distally into the connection portion 114, it can be machined to have different subsections. For example, as shown in FIG. 8A, locking section 1180 includes a middle subsection 170, a distal subsection 168 and a proximal subsection 178. In some instances, the middle subsection 170 has a uniform diameter D1 throughout its entire length. In embodiment represented by FIG. 8A, the distal subsection 168 distal to the middle section 170 may include a first taper that has a diameter D2 on its distal end and a diameter D1 at its proximal end. In some instances, the proximal subsection 178 includes a second taper that has a diameter D1 at its distal end and a diameter D2 at its proximal end. In some other implementations, the distal subsection 168 may not include the first taper but nevertheless transitions from D2 to D1 in a different fashion. Similar, in some embodiments, the proximal subsection 178 may not include the second taper but nevertheless transitions from D1 to D2 in a different fashion. For example, the transition between the first and second diameter may include one or more discontinuities or step changes. For a further example, the transition between the first and second diameters at the distal and proximal subsections 168 and 178 may not be linear, but parabolic. In still other embodiments, one of the distal subsection 168 and the proximal subsection 178 may be omitted entirely. In some instances, section 1200 and insulating portion 144 include polymer layer 250 and have a diameter D3. D3 is larger than D2, which is larger than D1. In some embodiments, diameter D1 is between 0.0050 inch and 0.020 inch, with some particular embodiments being 0.0073 inch, while D2 is between 0.010 inch and 0.016 inch, with some particular embodiments being 0.0107 inch and 0.013 inch. In some implementations, the entire length L1 of the locking section 1180 is between 0.060" and 0.200". In some instances, the middle section 170 has a length L2. Length L2 is between 0.020" and 0.100".

In some other embodiments shown in FIGS. 8B and 8C, a thickness of polymer layer 250 around the circumference of distal subsection 168 is machined or ground away, leaving a thinner polymer layer 250 in distal subsection 168. In some instances, as shown in FIG. 8B, after a thickness of the polymer layer 250 is machined away, a length of conductive ribbon 260 (one is shown) is exposed but remains insulated from proximal core 220. In some implementations illustrated in FIG. 8C, the length of conductive ribbons 260 shown in FIG. 8B is removed or shortened by machining, grinding, or cutting. The insulation layer 158 is then formed over the distal subsection 168 to protect residual conductive ribbons 260 in distal subsection 168, such those shown in FIGS. 8B and 8C, from being exposed to moisture, such as blood, saline solutions, enzyme cleaners, and/or other liquids.

In some implementations, locking section 1180 is formed by removing polymer layer 250, conductive ribbons 260 (not shown in FIG. 8A) embedded within the polymer layer 250, and a portion of the proximal core 220. In those implementations, once the conductive ribbons in locking section 1180 are removed, a proximal end portion of the conductive ribbons 260 in the connection portion 114 would be exposed. If left un-insulated, proximal ends of the conductive ribbons maybe exposed to moisture, such as blood, saline solutions, enzyme cleaners, and/or other liquids, causing shorts. Therefore, as shown in FIG. 8A, an insulation layer 158 is formed the proximal end portion of the connection portion 114 to insulate the exposed conductive ribbons 260 from moisture. As the insulation layer 158 can add further thickness of the polymer layer 250, the section where is insulation layer 158 is formed has a diameter D4. D4 is larger than D3. In some implementations, proximal core 220 is electrically coupled to an electrical ground and component 112 is electrically grounded by being electrically coupled to the distal core 210, which is electrically coupled to proximal core 220.

Reference is now made to FIG. 8D. Shown therein is a picture of locking section 1180 and section 1200 of the intravascular device 102. In some embodiments represented by FIG. 8D, at least a portion of section 1200 is covered by polymer layer 250 while polymer layer 250 is removed from another portion of section 1200 toward proximal end 110. In some other embodiments, polymer layer 250 is completely removed from section 1200 and section 1200 is free of polymer layer 250.

Figure 9:
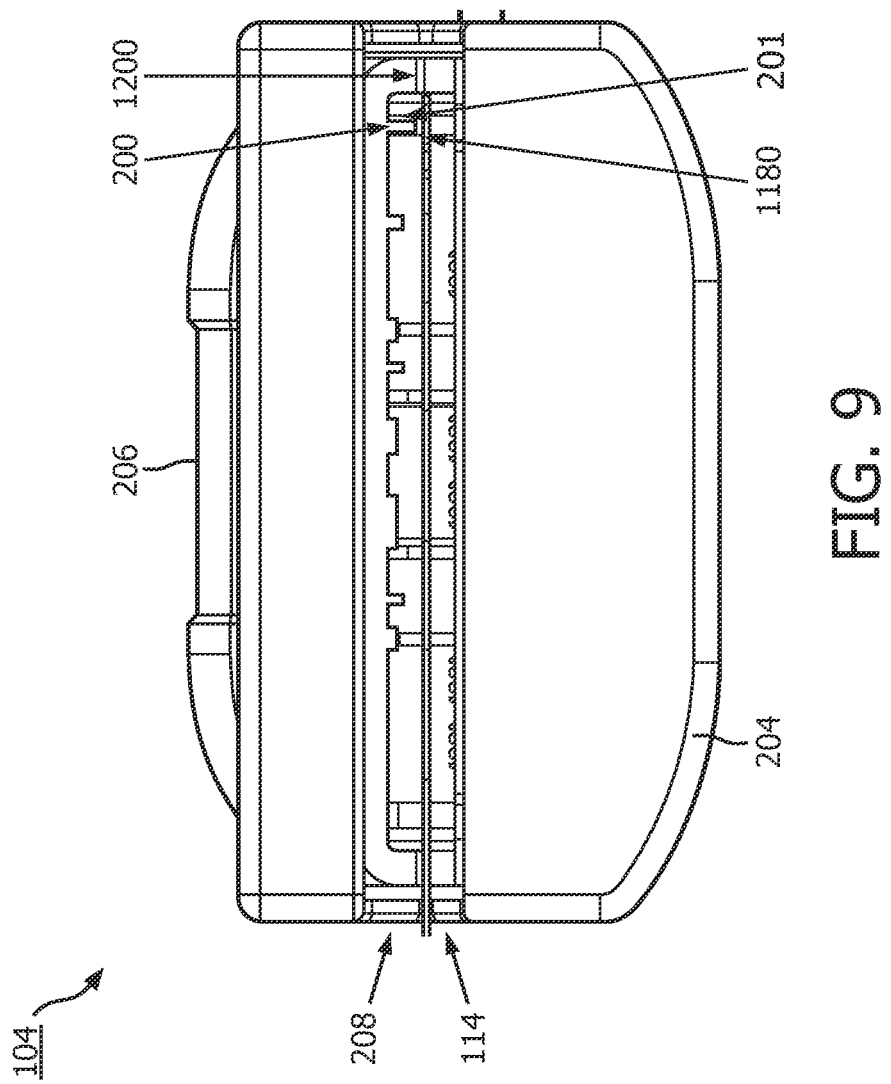
FIG. 9 is a diagrammatic top view of a connector of the intravascular system, while the connector is in an open position, according to aspects of the present disclosure.

Referring now to FIG. 9, shown therein is a diagrammatic top view of the connector 104 of the intravascular system 100. In some instances, the connector 104 of the present disclosure incorporates one or more features of the connectors described in P.C.T. Application No. PCT/M2016/054528, titled "SIDE-LOADING CONNECTORS WITH INLINE CABLING FOR USE WITH INTRAVASCULAR DEVICES AND ASSOCIATED SYSTEMS AND METHODS" and filed Jul. 28, 2016, U.S. patent application Ser. No. 13/930,787, titled "SIDE-LOADING CONNECTORS FOR USE WITH INTRAVASCULAR DEVICES AND ASSOCIATED SYSTEMS AND METHODS" and filed Jun. 28, 2013, and U.S. patent application Ser. No. 13/930,636, titled "SIDE-LOADING CONNECTORS FOR USE WITH INTRAVASCULAR DEVICES AND ASSOCIATED SYSTEMS AND METHODS" and filed Jun. 28, 2013, each of which is hereby incorporated by reference in its entirety. The example connector 104 shown in FIG. 9 includes a component 204 and a component 206. The component 204 includes a recess 208 sized and shaped to receive the connection portion 114 of the flexible elongate member 106. The component 206 is movable with respect to the component 204. In particular, the component 206 is slidable with respect to the component 204 to facilitate insertion of an intravascular device into the connector 104 and subsequent engagement of the connector with the received intravascular device that results in one or more electrical connections between the intravascular device and the connector. The sliding movement of the component 206 relative to the component 204 can be parallel to a longitudinal axis of the component 204 and/or the longitudinal axis of an intravascular device received within the connector 104. Component 204 includes a locking clip 200. The locking clip 200 includes a slit 201 sized and shaped to receive locking section 1180 while section 1200 is proximal to the locking clip 200.

Figure 10:
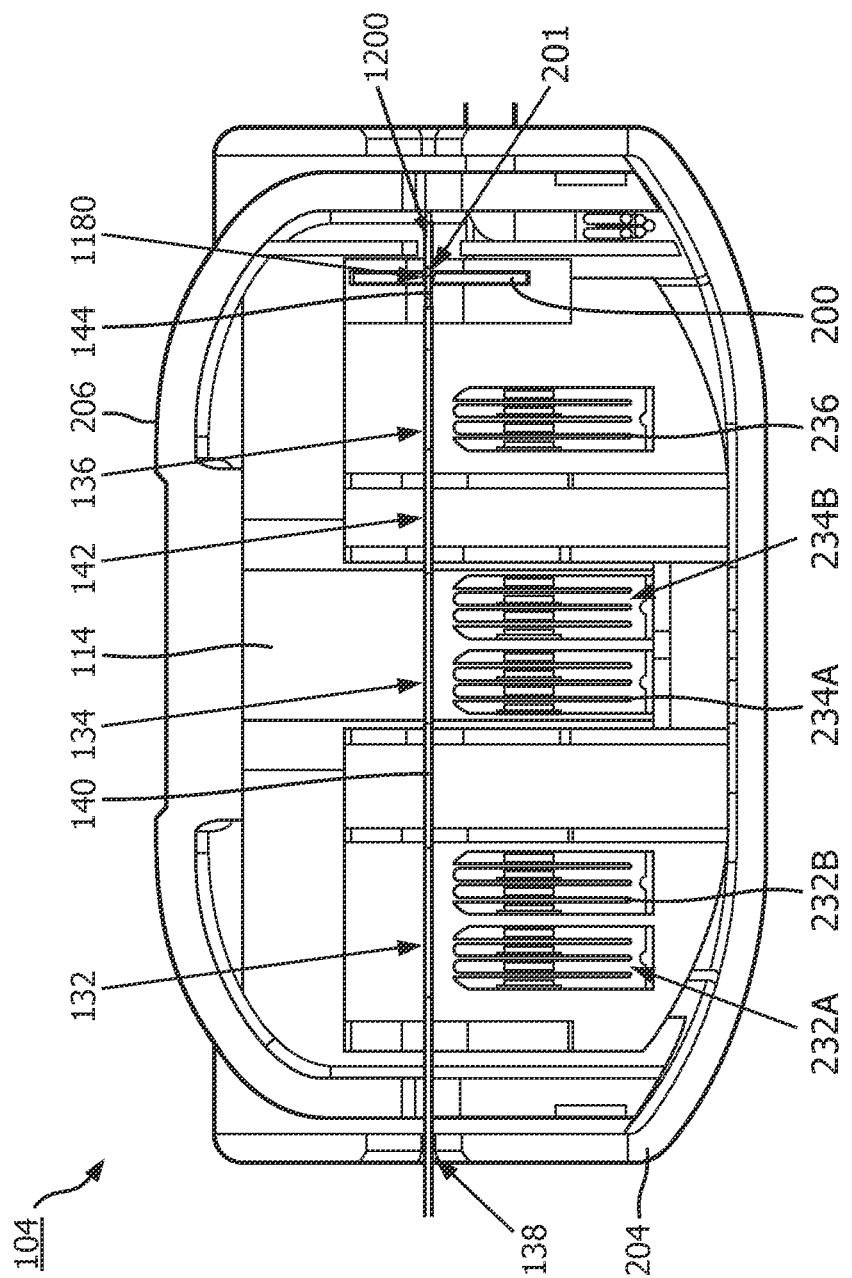
FIG. 10 is a diagrammatic top cross-sectional view of a connector, according to aspects of the present disclosure.

FIG. 10 shows a diagrammatic cross-sectional view of the connector 104. In some embodiments, component 206 includes split, open-comb electrical contacts 232A, 232B, 234A, 234B, and 236. When connection portion 114 is received within recess 208 and locking section 1180 is received within slit 201, conductive portion 132 is aligned with electrical contacts 232A and 232B along a direction of the relative movement between component 204 and component 206. Similarly, along the same direction of movement, conductive portion 134 is aligned with electrical contacts 234A and 234B and conductive portion 136 is aligned with electrical contacts 236. In some embodiments, conductive portions 132, 134 and 136 are separated by insulating portions 138, 140, and 142. In some instances, connection portion 114 also includes an insulating portion 144 distal to locking section 1180. As locking section 1180 is of a reduced diameter as compared to section 1200 and insulating portion 144 (or conductive portion 136 if insulating portion 144 is not present), the connection portion 114 is prevented from moving along its lengthwise direction, either distally or proximally.

Further, the open-comb electrical contacts are particularly well-suited to facilitate proper electrical connection between the connector 202 and an intravascular device 102 positioned within the recess 208 of component 204 when the component 206 is translated relative to the component 204 from the open position towards the closed position. Further still, the open-comb configuration allows for the intravascular device to be rotated with respect to the connector while maintaining a proper electrical connection. Thus, the open-comb configuration allows a user (e.g., surgeon) to keep the connector 202 connected to the intravascular device while the intravascular device is moved or advanced through the vasculature with little resistance to rotational movement of the intravascular device. In other words, the intravascular device can be moved through the vasculature, undergoing various twists and turns, without the connector 202 needing to move with the rotations of the intravascular device. Also, the open-comb configuration helps ensure good electrical contact due to the multiple fingers for each of the contacts. In addition, the open end of the open-comb configuration provides a good guide for ensuring that the intravascular device is correctly positioned when the component 206 is closed. While various advantages of the open-comb configuration have been described, it is understood that any appropriately sized electrical contacts can be utilized, including a single contact or a plurality of contacts.

Figure 11:
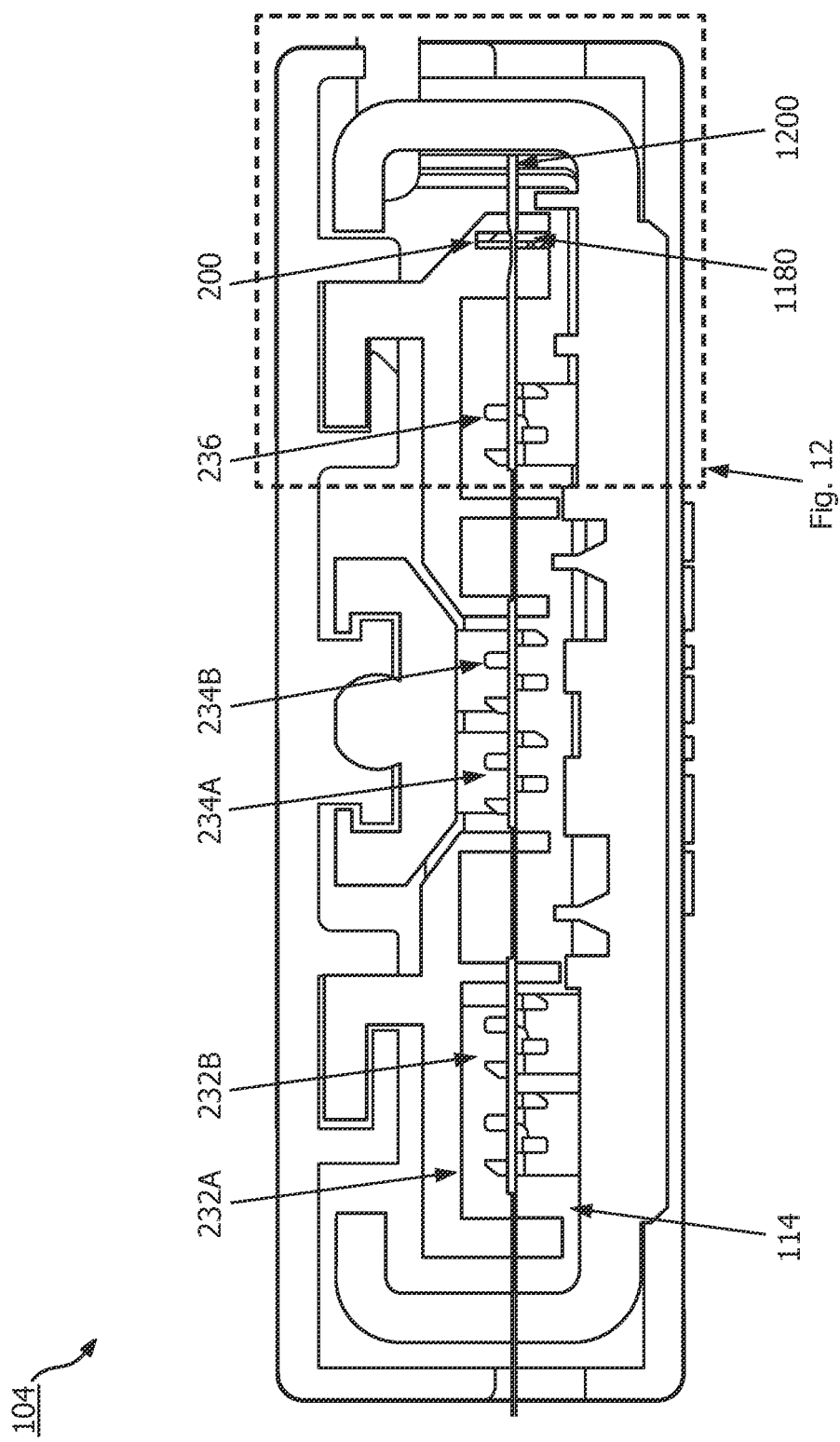
FIG. 11 is diagrammatic side cross-sectional view of a connector, according to aspects of the present disclosure.

Referring now to FIG. 11, shown therein is diagrammatic cross-sectional side view of connector 104. FIG. 11 shows how conductive portions engage the split, open-comb electrical contacts 232A, 232B, 234A, 234B, and 236 and how locking section 1180 is received within slit 201 of locking clip 200. In some instances, each of the electrical contacts has two arms that bend upward and two arms that bend downwards. Each of the electrical contacts can also have more or less arms bending different directions. For example, each of the electrical contacts can have one or three arms bending upwards and one or three arms bending downwards. In some embodiments, the slit 201 extends halfway through the height of the locking clip 200. To further illustrate the details of locking clip 200, the proximal portion of connector 104 is enlarged and shown in FIG. 12. In some embodiments, locking clip 200 includes a top portion 205 that tilts proximally at a tilt angle. The tilt angle is defined between the plane where the top portion 205 resides and the plane where the rest of locking clip 200 resides. In some instances, the tilt angle is between 10 and 90 degrees. Once locking section 1180 is received in slit 201 of locking clip 200, the proximally tilting top portion 205 prevents locking section 1180 from slipping upwards out of the slit 201. Advantageously, the engagement of locking section 1180 and slit 201 of locking clip 200 ensure reliable electrical connection between conductive portions 132, 134, and 136 of connection portion 114 and split, open-comb electrical contacts 232A, 232B, 234A, 234B, and 236 in connector 104. In addition, as locking section 1180 is integral with proximal core 220 that extends through connection portion, locking section 1180 is less prone to failure. Such failure includes locking section 1180 detaching from connection portion 114. In the undesirable case of such detachment, connection portion 114, along with conductive portions 132, 134 and 136, would be allowed to move along a longitudinal direction of flexible elongate member 106, resulting in unreliable electrical connection between conductive portions 132, 134 and 136 and open-comb electrical contacts 232A, 232B, 234A, 234B, and 236 in connector 104.

Figure 12:
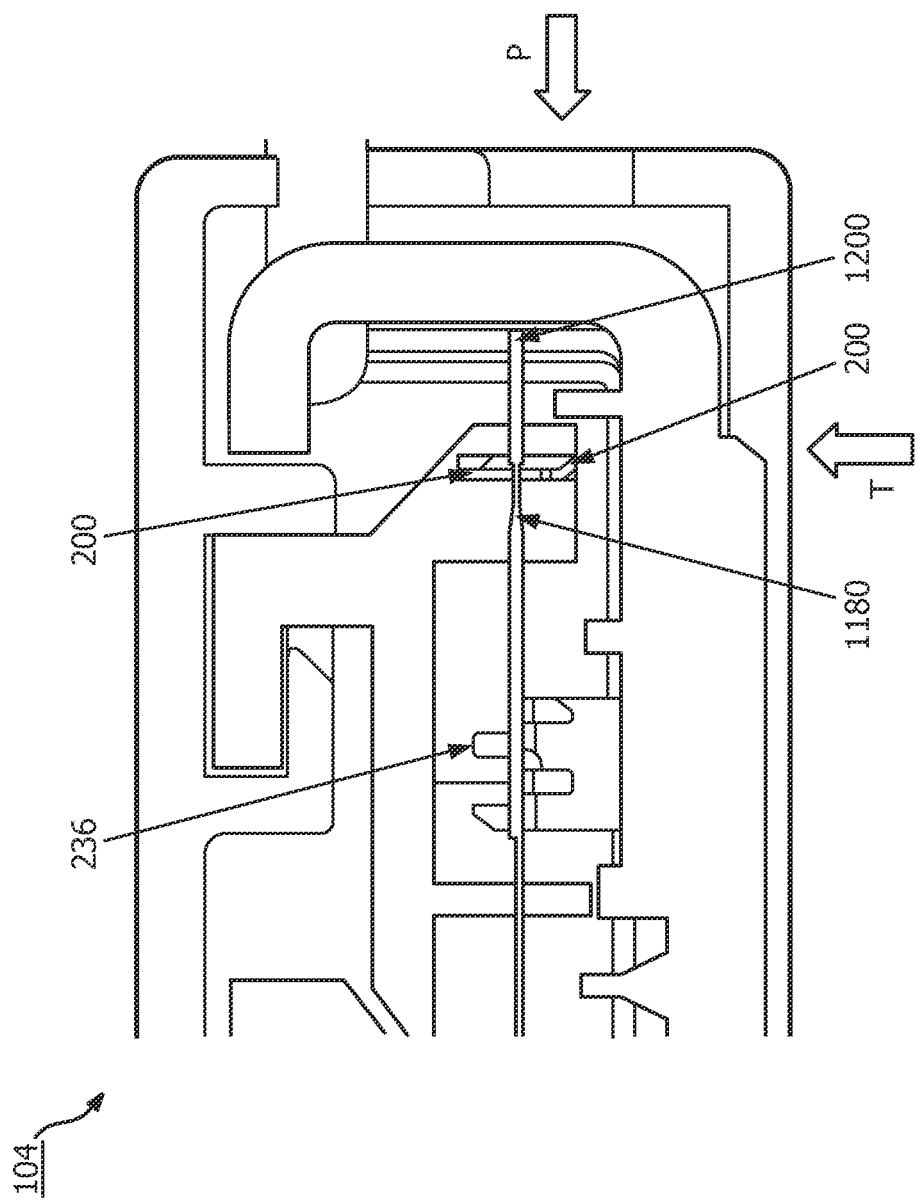
FIG. 12 is a diagrammatic enlarged view of a portion of the connector in FIG. 11, according to aspects of the present disclosure.
Figure 13:
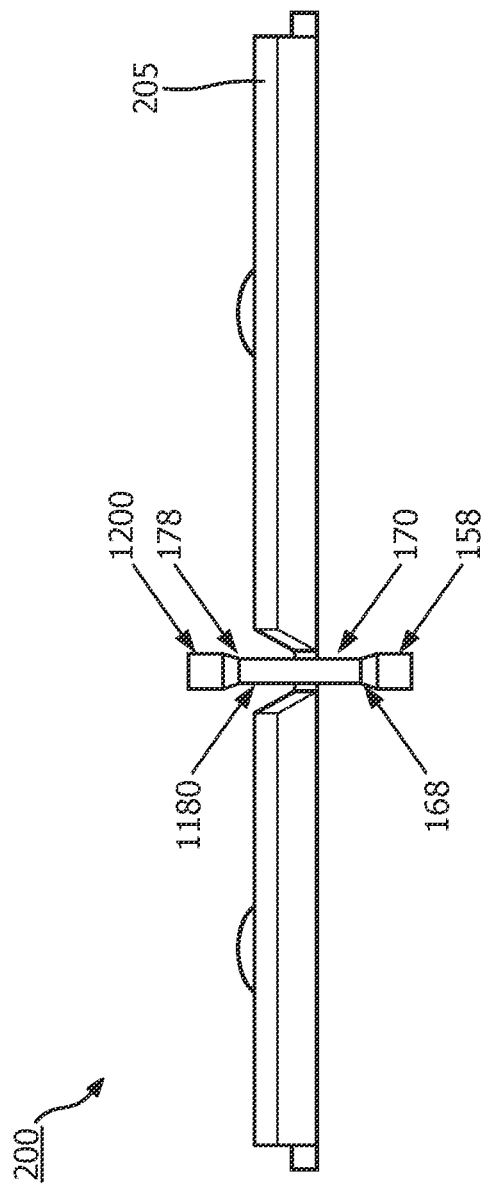
FIG. 13 is a diagrammatic top view of a locking clip, according to aspects of the present disclosure.
Figure 14:
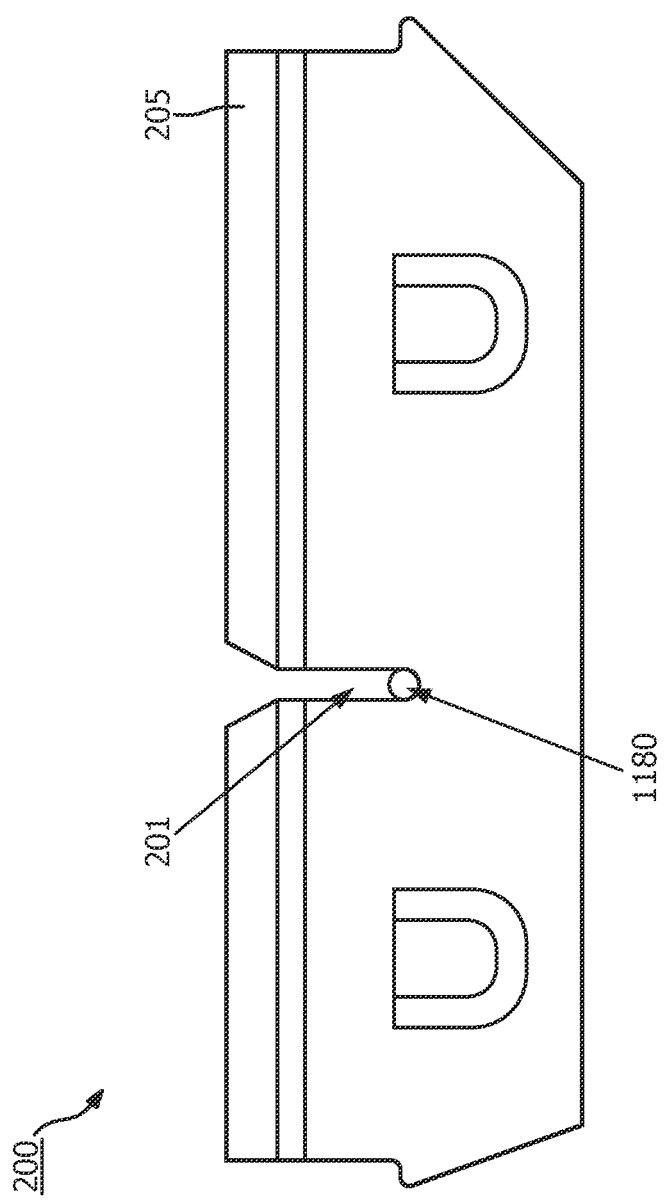
FIG. 14 is a diagrammatic proximal view of a locking clip, according to aspects of the present disclosure.

FIG. 13 is a diagrammatic top view of locking clip 200 from direction T shown in FIG. 12. In some embodiments, locking section 1180 includes distal subsection 168, middle subsection 170, and proximal subsection 178. When locking section 1180 is received within slit 201 of locking clip 200, the movement of locking section 1180 relative to locking clip 200 is limited to the length of the middle subsection 170. The proximally tilting top portion 205 can engage the proximal portion 178 and section 1200 to prevent locking section 1180 from slipping out of the slit 201. FIG. 14 is a diagrammatic proximal view of locking clip 200 from direction P shown in FIG. 12. In some instances, locking section 1180 is received within slit 201 of locking clip 200. The top portion 205 tilts proximally at the tilt angle. In some embodiments, slit 201 extends half way through the height of locking clip 200.

Figure 15:
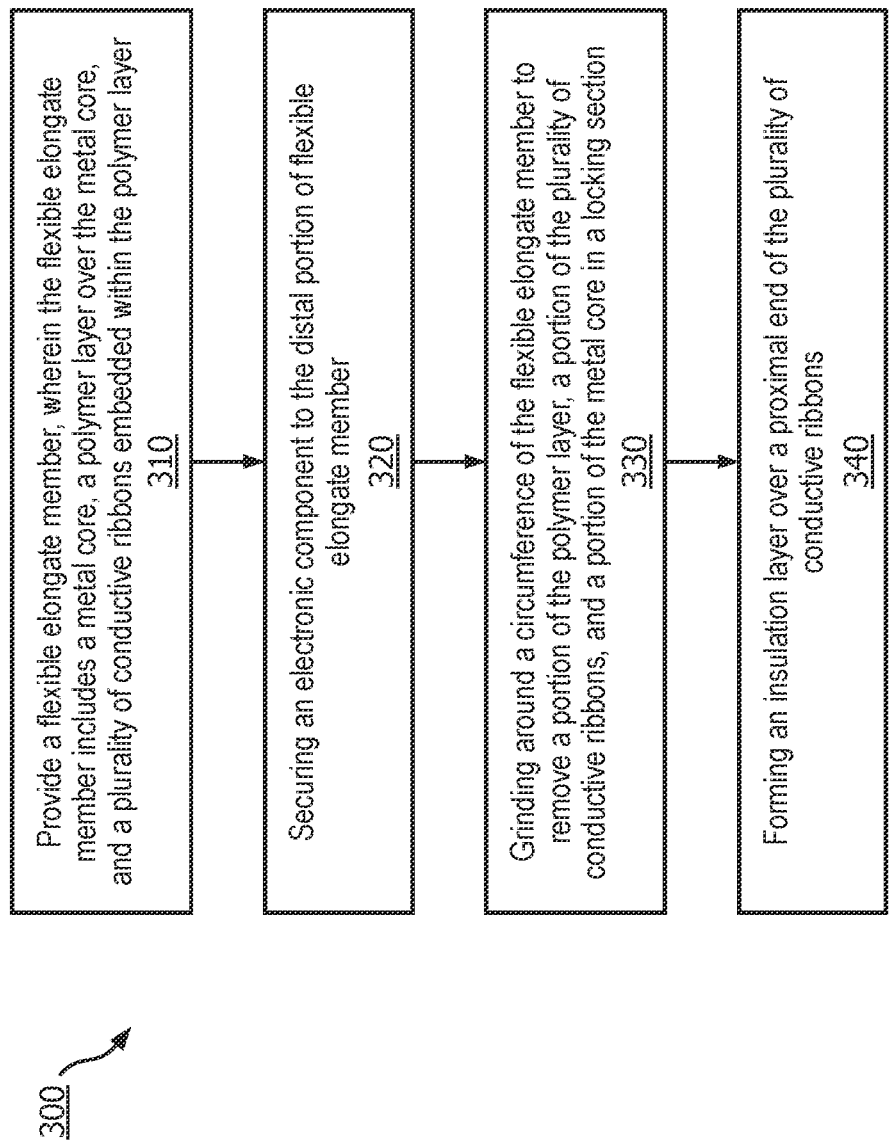
FIG. 15 is a flowchart of a method of fabricating an intravascular device, according to aspects of the present disclosure.

Referring now to FIG. 15, shown therein is a flowchart of method 300 for fabricating intravascular device 102. Method 300 includes a step 310 of: providing a flexible elongate member, wherein the flexible elongate member includes a metal core, a polymer layer over the metal core, and a plurality of conductive ribbons embedded within the polymer layer; a step 320 of: securing an electronic component to the distal portion of flexible elongate member; a step of: machining around a circumference of the flexible elongate member to remove a portion of the polymer layer, a portion of the plurality of conductive ribbons, and a portion of the metal core in a locking section; and a step 340 of: forming an insulation layer over a proximal end of the plurality of conductive ribbons.

At step 310, a flexible elongate member such as flexible elongate member 106 shown in FIG. 2 is provided. In some embodiments, flexible elongate member 106 includes a metal core such as distal core 210 and proximal core 220 in FIG. 6. In other embodiments, the flexible elongate member 106 includes a single metal core along its entire length. Flexible elongate member 106 has distal portion 107 and proximal portion 109. In some instances, the metal core is formed of stainless steel, or super-elastic materials such as Nitinol or NiTiCo. Flexible elongate member 106 also includes a polymer layer, such as polymer layer 250 shown in FIG. 6, over the proximal core 220. In some implementations, polymer layer 250 is formed of polyethylene terephthalate (PET) or other suitable insulative, flexible polymer materials. Flexible elongate member 106 further includes a plurality of conductive ribbons embedded in the polymer layers. For example, conductive ribbons 260 in FIGS. 6, 7A and 7B are embedded in polymer layer 250. Polymer layer 250 surrounding conductive ribbons 260 electrically insulate conductive ribbons 260 from one another and from proximal core 220. In some embodiments, flexible elongate member 106 is continuously formed and is available for purchases in rolls of hundreds or even thousands of feet. At step 310, flexible elongate member 106 is cut to a length of 1300 mm, 1400 mm, 1900 mm, 3000 mm, 4000 mm, or other suitable length.

At step 320, an electronic component, such as component 112 shown in FIG. 2, is secured to a distal portion of the flexible elongate member, such as distal portion 107 of flexible elongate member 106. In some embodiments, flexible elongate member 106 has a single metal core. In those embodiments, component 112 is mounted in a housing secured to distal portion 107 of flexible elongate member 106. In some other embodiments, as shown in FIG. 6, flexible elongate member 106 includes distal core 210 and proximal core 220. Distal core 210 is a part of a distal subassembly, and the distal subassembly includes component 112. Generally, the component 112 is representative of one or more electronic, optical, or electro-optical components. In that regard, component 112 can include a pressure sensor, a temperature sensor, an imaging element, an optical fiber, an ultrasound transducer, a reflector, a mirror, a prism, an ablation element, an radio frequency (RF) electrode, a conductor, and/or combinations thereof. In some embodiments, component 112 is electrically coupled to the plurality of conductive ribbons, such as conductive ribbons 260 shown in FIGS. 7A and 7B.

At step 330, in order to form a locking feature, a portion of the polymer layer, a portion of the plurality of conductive ribbons embedded within the polymer layer, and a portion of the metal core is removed from a locking section by machining around a circumference of the flexible elongate member. For example, a portion of polymer layer 250, including any conductive ribbons 260 embedded therein, is removed from the locking section 1180 shown in FIG. 8A by machining around the circumference of the locking section 1180. In some embodiments, a portion of proximal core 220 is also machined away from the locking section 1180 to form the proximal subsection 178, the middle subsection 170, and the distal subsection 168. In some other embodiments, one of the proximal subsection 178 and the distal subsection 168 is omitted entirely. In the embodiments represented by FIG. 8A, the proximal subsection 178 includes the second taper that has diameter D2 at its proximal end and diameter D1 at its distal end. In those embodiments, the distal subsection 168 includes the first taper that has diameter D1 at its proximal end and diameter D2 at its distal end. As described above, sometimes, the distal subsection 168 or the proximal subsection 178 may not include a taper but nevertheless transitions from the first diameter to the second diameter or vice versa. As proximal core 220 remains continuous throughout section 1200, locking section 1180 and connection portion 114, no separate locking core has to be soldered to proximal core 220. In some embodiments, after polymer layer 250 and conductive ribbons 260 embedded within polymer layer 250 is removed from section 1180, proximal core 220 in section 1180 can be shaped by a one or more machining and/or shaping processes. Such machining and/or shaping processes include rolling, grinding, laser ablation, electrical discharge machining (EDM), and lathing. In some instances, these shaping processes involve locally heating section 1180. In some implementation, the shaping process is carried out by a computer-aid manufacturing (CAM) tool.

At step 340, an insulation layer is formed over a proximal end portion of the plurality of the conductive ribbons. For example, as shown in FIG. 8A, after polymer layer 250 and conductive ribbons 260 are removed from locking section 1180, proximal ends of the conductive ribbons 260 immediately distal to locking section 1180 are exposed. Insulation layer 158 is then formed over the proximal end portion of the conductive ribbons to insulate them from moisture, blood, bodily fluids, saline solutions, enzymatic cleaner solutions, and other disinfectants.

Method 300 can include additional steps, such as those relating to formation of conductive portions. In some embodiments, method 300 further includes a step to remove a portion of polymer layer over a section of the connection portion to expose one of the plurality of conductive ribbons. Thereafter, method 300 includes an additional step of forming a conductive layer over the exposed conductive ribbon. In some instances, the conductive layer is a coating of conductive ink. In other instances, the conductive layer is a metal ring.

Persons skilled in the art will also recognize that the apparatus, systems, and methods described above can be modified in various ways. Accordingly, persons of ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. An intravascular system, comprising:
an intravascular guidewire comprising a flexible elongate member,
wherein the flexible elongate member comprises a proximal portion and a distal portion,
wherein the distal portion comprises an electronic component,
wherein the proximal portion comprises:
a metal core extending along at least part of the flexible elongate member, the metal core comprising a first section and a second section, wherein the second section is proximal of the first section along a length of the metal core, wherein the first section extends along the proximal portion of the flexible elongate member; and
a polymer layer surrounding the first section,
wherein the first section and the second section are integrally formed such that no attachment interface is located between the first section and the second section,
wherein the first section of the metal core comprises a first diameter, and
wherein the second section of the metal core comprises:
a first subsection comprising a second diameter, and
a second subsection comprising a non-constant diameter,
wherein the polymer layer does not surround the second section such that an outer surface of the first subsection and the second subsection are exposed; and
a connector distinct from the intravascular guidewire,
wherein the connector is configured to couple to the proximal portion of the flexible elongate member,
wherein the connector includes a recess along a longitudinal axis of the connector, wherein the recess is sized and shaped to receive the proximal portion of the flexible elongate member,
wherein the connector comprises a locking clip with a slit sized and shaped to receive the second section, wherein the locking clip is disposed within the connector perpendicular to the longitudinal axis, and
wherein the second section is configured to be received within the slit of the locking clip to limit a movement of the second section relative to the locking clip to a length of the first subsection.

2. The intravascular system of claim 1, wherein the second diameter is smaller than the first diameter.

3. The intravascular system of claim 1, wherein the second subsection is one of distal or proximal to the first subsection.

4. The intravascular system of claim 1, wherein the locking clip comprises a top portion tilting proximally at a tilt angle.

5. The intravascular system of claim 1, wherein the proximal portion terminates at a proximal end, the proximal end comprising the first diameter.

6. The intravascular system of claim 1, wherein the flexible elongate member further comprises:
a plurality of conductive ribbons embedded within the polymer layer.

7. The intravascular system of claim 6,
wherein the proximal portion of the flexible elongate member comprises an insulation layer formed over a proximal portion of the plurality of conductive ribbons, and
wherein the insulation layer is distal to the second section.

8. The intravascular system of claim 6, wherein the proximal portion of the flexible elongate member comprises a conductive portion in communication with one of the plurality of conductive ribbons.

9. The intravascular system of claim 8, wherein the conductive portion comprises a conductive ink.

10. The intravascular system of claim 1, wherein the metal core comprises an electrical ground for the electronic component.

11. The intravascular system of claim 1, wherein the electronic component comprises at least one of a pressure sensor or a flow sensor.

12. The intravascular system of claim 1,
wherein the second section further comprises a third subsection comprising a non-constant diameter, and
wherein the third subsection is exposed.

13. The intravascular system of claim 12, wherein the second subsection is distal to the first subsection and the third subsection is proximal to the first subsection.

14. The intravascular system of claim 13,
wherein the second subsection comprises a proximal end with the second diameter and a distal end with the first diameter such that the second subsection provides a transition from the first diameter to the second diameter,
wherein the third subsection comprises a proximal end with the first diameter and a distal end with the second diameter such that the third subsection provides a transition from the second diameter to the first diameter.

15. The intravascular system of claim 14,
wherein the transition from the first diameter to the second diameter comprises a taper from the first diameter to the second diameter, and
wherein the transition from the second diameter to the first diameter comprises a taper from the second diameter to the first diameter.

16. The intravascular system of claim 14,
wherein the transition from the first diameter to the second diameter comprises a non-linear transition from the first diameter to the second diameter, and
wherein the transition from the second diameter to the first diameter comprises a non-linear transition from the second diameter to the first diameter.

17. The intravascular system of claim 14, wherein the metal core further comprises a third section proximal to the second section,
wherein the third section comprises the first diameter, and
wherein a further polymer layer surrounds at least a portion of the third section.

18. The intravascular system of claim 1,
wherein the first diameter is constant along a length of the first section of the metal core,
wherein the second diameter is constant along a length of the first subsection of the second section of the metal core, and
wherein the non-constant diameter gradually changes along a length of the second subsection of the second section of the metal core.

19. The intravascular system of claim 1, wherein a length of the first subsection is greater than a length of the second subsection.

* * * * *